Figure 1:
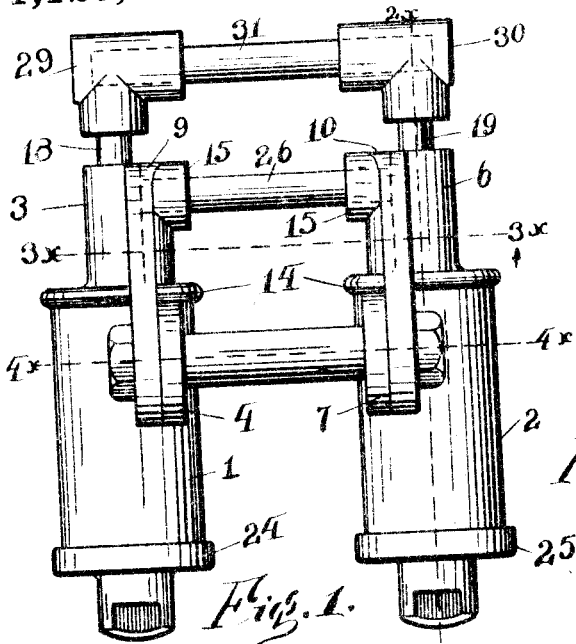

A. MAGIN.
SHOCK ABSORBER.
APPLICATION FILED JULY 6, 1914.

1,129,581.

Patented Feb. 23, 1915.

Witnesses
Eric Ischinger
Alice M. Johanns

Inventor
August Magin
By Frank Keifer
Attorney

UNITED STATES PATENT OFFICE.

AUGUST MAGIN, OF ROCHESTER, NEW YORK.

SHOCK-ABSORBER.

1,129,581.

Specification of Letters Patent.

Patented Feb. 23, 1915.

Application filed July 6, 1914. Serial No. 849,251.

*To all whom it may concern:*

Be it known that I, AUGUST MAGIN, a citizen of the United States, residing at Rochester, in the county of Monroe and State of New York, have invented certain new and useful Improvements in Shock-Absorbers, of which the following is a specification.

The object of this invention is to provide a new and improved shock absorber.

This and other objects of the invention will be fully illustrated in the drawings, described in the specification and pointed out in the claims at the end thereof.

Figure 2:
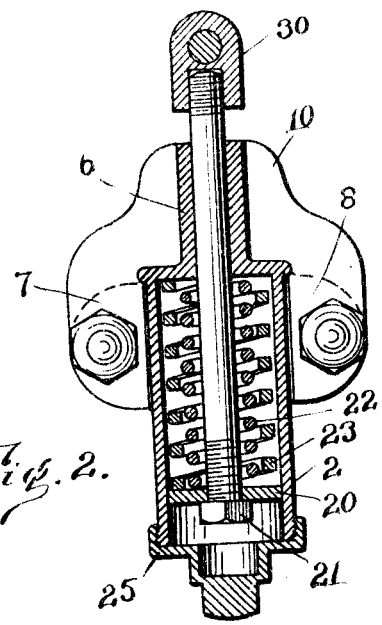
Figure 3:
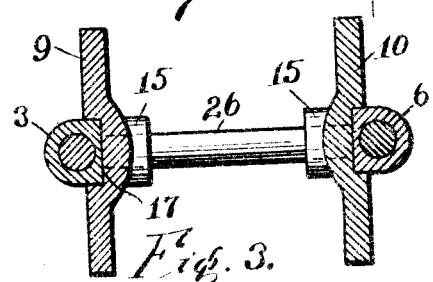
Figure 5:
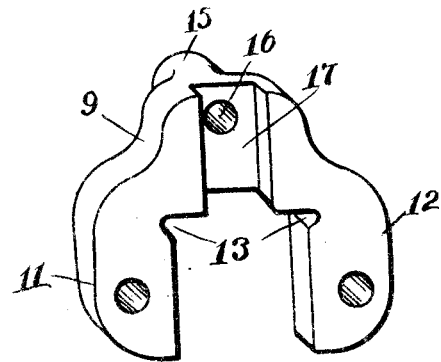
Figure 4:
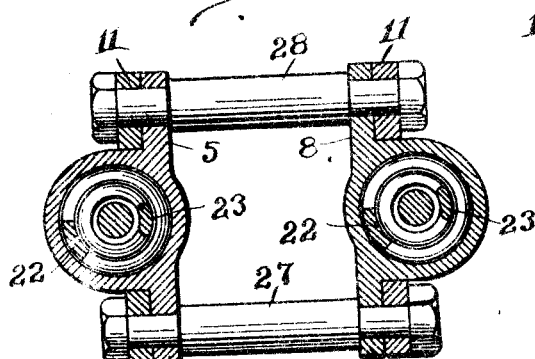

In the drawings, Figure 1 is a side elevation of the shock absorber as it will appear in place on the car when viewed from the rear of the car. Fig. 2 is a vertical section on the line 2*—2* of Fig. 1. Fig. 3 is a horizontal section on the line 3*—3* of Fig. 1, looking upward. Fig. 4 is a horizontal section on the line 4*—4* of Fig. 1, looking downward. Fig. 5 is a detail perspective view of one of the supporting brackets used in my absorber.

In the drawings like reference numerals indicate like parts.

In my shock absorber are provided the cylinders 1 and 2. The cylinder 1 has cast thereon the reduced neck 3 and the lugs 4 and 5. The cylinder 2 has cast thereon the neck 6 and the lugs 7 and 8. Mounted on each of these cylinders are the brackets 9 and 10 respectively. These brackets are duplicates of each other, one of these brackets being shown in perspective in Fig. 5. As shown in Fig. 5 at the rear end of the bracket 9 is provided the ears 11 and 12 which embrace opposite sides of the cylinder 1. The bracket is recessed at 13 to receive the flange 14 on the top of the cylinder. On the bracket 9 is also provided the boss 15 which is perforated at 16 to receive the stud or pin 26. The bracket is also formed with a guide 17 which engages with the side of the neck 3 which is made square on one side to furnish a bearing therefor, the other side of the neck being left half round.

The necks 3 and 6 are perforated to receive the stems 18 and 19. These stems extend down into the cylinder and have on the lower ends thereof, the piston 20 which is held thereon by the nut 21. Between the piston 20 and the top of the cylinder is provided two compression springs 22 and 23. The bottoms of the cylinders are closed with the caps 24 and 25 respectively. At the top, the stems 18 and 19 are provided with the bearings 29 and 30 which are fastened thereto in any suitable manner, being preferably threaded and brazed into them. Each of these bearings is provided with a recess shown in dotted lines at the top of Fig. 1 and by full lines in Fig. 2. In these bearings is supported the stud 31.

After the cylinders, springs and piston are assembled, in the manner heretofore described, the two cylinders are connected together as follows: The brackets 9 and 10 are placed on their respective cylinders and the cylinders, brackets and bearings are brought together with the bolts 27 and 28 and the pins or studs 26 and 31 placed in their respective places. The brackets and bearings on the pistons are held apart by the pins 26 and 31 and the brackets and cylinders are held apart and fastened together by the bolts 27 and 28.

The bolts 27 and 28 are suitably shouldered for the purpose of holding the cylinders and brackets apart and are provided with reduced ends which pass through the openings provided in the brackets and the lugs on the cylinders. These reduced ends are threaded to receive the nuts by which the cylinders and brackets are suitably clamped together, holding the stud 26 in place, the stud 26 being long enough to span the opening between the two brackets 9 and 10 and fill the opening in the two bosses 15, so that it extends between the flat inner surfaces of the necks 3 and 6 by which the stud 26 is held against longitudinal movement. The stud 31 is long enough to span the opening between the bearings 29 and 30 and fill the openings in said bearings by which bearings it is held against longitudinal movement.

In use, this shock absorber is interposed between the body and axle of an automobile in the ordinary manner, the stud 31 being connected directly or indirectly to the axle and the stud 26 being connected directly or indirectly to the body of the car, the ordinary method of fastening being to the springs that are connected to these two parts of the car. When the axle raises or the body falls in the running of the car, the studs move accordingly and the springs 22 and 23 are compressed, causing the movement to be taken up locally so as not to be communicated to the large springs or the car body.

In applying shock absorbers to different types of cars it is necessary to vary the distance between centers of the pins 26 and 31. This is done by turning the nut 21 on the stems or piston rods 18 and 19 which raises or lowers the pistons or by substituting brackets of different lengths for the brackets 9 and 10 so as to carry the pin 26 higher or lower as may be desired or by doing both of these things. A considerable wear takes place between the pin 26 and its bearings and when the parts become unserviceable because of wear, the brackets 9 and 10 and pin 26 can be replaced by new parts thus permitting the use of old cylinders. The pin 31 wears less rapidly than the pin 26, due to the difference in the thrust that it receives and due to the fact that it is supported in longer bearings.

I claim:

1. In a shock absorber the combination of a pair of cylinders, springs carried in said cylinders, a piston and piston rod carried in each cylinder, said piston working to compress said springs, the piston rods extending out of said cylinders and being connected for joint operation by a bearing pin, said cylinders being also connected for joint operation, said cylinder connections including a bracket clamped to each of said cylinders, each of said brackets having an ear in each side thereof, pins to clamp said ears to said cylinders and hold said brackets a predetermined distance apart, a pin supported between said brackets.

2. In a shock absorber the combination of a pair of cylinders, a pair of lugs on the sides of each cylinder and a flange and a neck on the top of each cylinder, a bracket clamped to each cylinder, each bracket having a pair of lugs adapted to bear against the lugs on the cylinder, a laterally extending recess adapted to receive the flange, a vertically extending recess adapted to receive the neck of the cylinder.

3. In a shock absorber the combination of a pair of cylinders, a pair of lugs on the sides of each cylinder and a flange and a neck on the top of each cylinder, a bracket clamped to each cylinder, each bracket having a pair of lugs adapted to bear against the lugs on the cylinder, a laterally extending recess adapted to receive the flange, a vertically extending recess adapted to receive the neck of the cylinder, a pair of bolts having shouldered ends for clamping said cylinders and brackets together and for holding said cylinders suitably spaced apart.

4. In a shock absorber the combination of a pair of cylinders, a pair of lugs on the sides of each cylinder and a flange and a neck on the top of each cylinder, a bracket clamped to each cylinder, each bracket having a pair of lugs adapted to bear against the lugs on the cylinder, a laterally extending recess adapted to receive the flange, a vertically extending recess adapted to receive the neck of the cylinder, a pair of bolts having shouldered ends for clamping said cylinders and brackets together and for holding said cylinders suitably spaced apart, a pin supported between said brackets.

5. In a shock absorber the combination of a pair of cylinders, springs carried in said cylinders, a piston rod carried in each of said cylinders, bearing plates on each side of said cylinders, means for rigidly connecting and spacing apart said bearing plates, said piston rods having a bearing pin mounted loosely between them at their ends and moving therewith, said cylinders also having a bearing pin loosely mounted between them and moving therewith.

In testimony whereof I affix my signature in presence of two witnesses.

AUGUST MAGIN.

Witnesses:
ERIC ESCHINGER,
EDNA K. BOOTH.